July 20, 1948.  R. SARDESON ET AL  2,445,496
PHOTOGRAPHIC FILM HOLDER
Filed Aug. 12, 1944  2 Sheets-Sheet 1

Inventors
ROBERT SARDESON
EDWARD H. SAVELA
By Chas. C. Reif.
Attorney.

July 20, 1948. R. SARDESON ET AL 2,445,496
PHOTOGRAPHIC FILM HOLDER
Filed Aug. 12, 1944 2 Sheets-Sheet 2
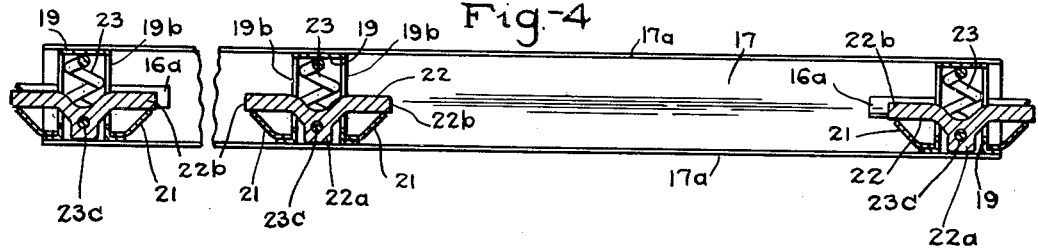
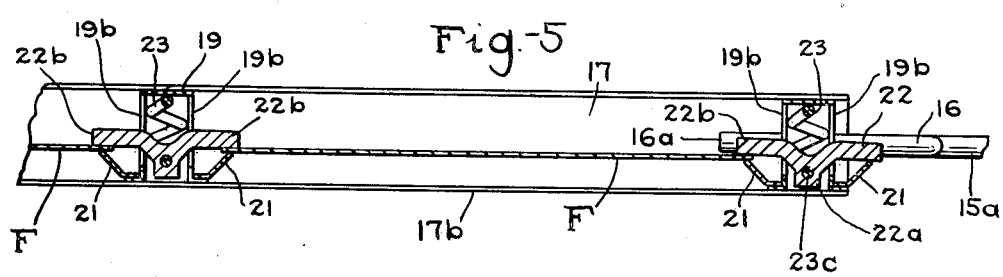
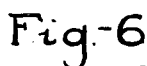
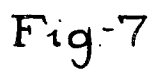
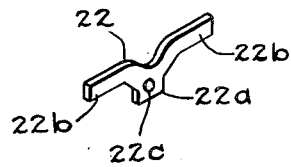
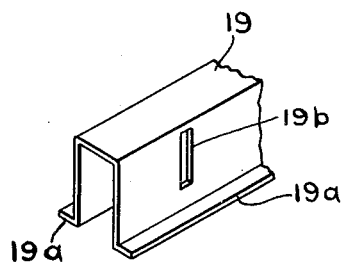
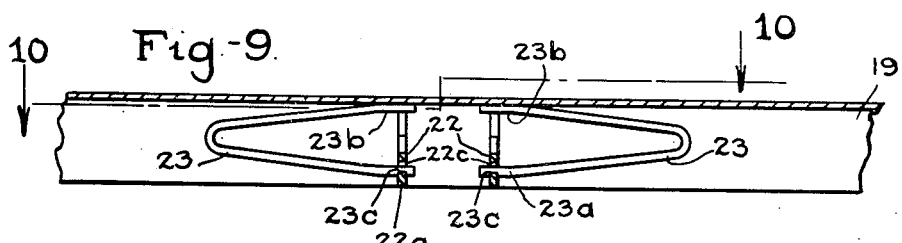
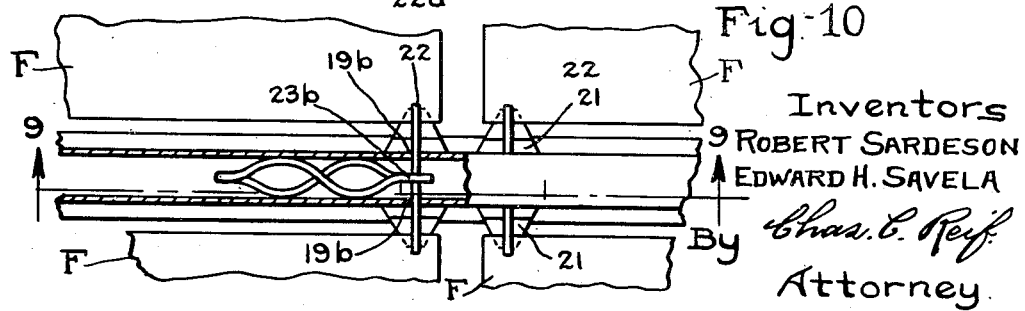
Inventors
Robert Sardeson
Edward H. Savela
By Chas. C. Reif
Attorney Patented July 20, 1948

2,445,496

UNITED STATES PATENT OFFICE 2,445,496

PHOTOGRAPHIC FILM HOLDER

Robert Sardeson and Edward H. Savela, Minneapolis, Minn., assignors to Pako Corporation, Minneapolis, Minn., a corporation of Delaware Application August 12, 1944, Serial No. 549,163

17 Claims. (Cl. 95—100)

This invention relates to a film hanger or holder adapted to securely hold a plurality of photographic films. Some films can be pierced and hangers have been proposed having piercing means on which the films are impaled. In other cases it is not desirable to pierce the films and it is necessary to have gripping means to grip the edge portions of the films to hold the same for easy and convenient handling and processing.

It is an object of this invention to provide a film hanger comprising a frame having spaced portions, each of said portions having a plurality of gripping means thereon, each of said gripping means comprising a pair of gripping members.

It is a further object of the invention to provide such a hanger as set forth in the preceding paragraph in which said gripping means are urged into gripping relation by resilient means.

It is also an object of this invention to provide a film holder having a frame with a plurality of spaced gripping means thereon so constructed and arranged that all of said gripping means may be simultaneously operated to receive and grip a plurality of films.

Another object of the invention is to provide a film holder having a frame comprising a plurality of substantially parallel portions, each of said portions having thereon a plurality of spaced gripping means respectively aligned on said portions, each of said gripping means comprising a pair of gripping members resiliently urged into gripping relation.

It is another object of the invention to provide a hanger having a frame with spaced substantially parallel elongated portions thereon, each of said portions having a plurality of spaced gripping means, said gripping means each comprising a pair of gripping members, one of which is fixed in relation to said portion and the other of which is movable in relation to said portion.

It is more specifically an object of the invention to provide a film holder comprising a frame having spaced substantially parallel members, said members having spaced walls or being in the form of channels, each of said members carrying a plurality of spaced gripping means, each of said means comprising a pair of gripping members, one of the gripping members of each pair being secured to the walls of said member or channel and the other gripping member of each pair being relatively movable to said side walls or said channel.

It is still further an object of the invention to provide a hanger such as set forth in the preceding paragraph in which said gripping member that is rigid with the said side walls or channel projects laterally therefrom and the gripping member that is movable relatively to said side walls or channel has a portion disposed between said side walls or the sides of said channel and a portion projecting through a side wall or the side of said channel together with resilient means disposed in said channel for urging said gripping members into gripping relation.

These and other objects and advantages of the invention will be fully set forth in the following description made in connection with the accompanying drawings in which like reference characters refer to similar parts throughout the several views and in which:

Fig. 4 is a vertical section taken on line 4—4 of Fig. 1 as indicated by the arrows;

Fig. 5 is a partial section taken on line 5—5 of Fig. 3 as indicated by the arrows;

Fig. 6 is a detail view in perspective showing one of the gripping members;

Fig. 7 is a perspective view showing the other of the gripping members;

Fig. 8 is a perspective view showing a part of the channel portion of said hanger;

Fig. 9 is a vertical section taken on line 9—9 of Fig. 10 as indicated by the arrows; and Fig. 10 is a view partly in horizontal section and partly in plan taken on line 10—10 of Fig. 9 as indicated by the arrows, Figs. 5 to 10 being shown on an enlarged scale.

Figure 1:
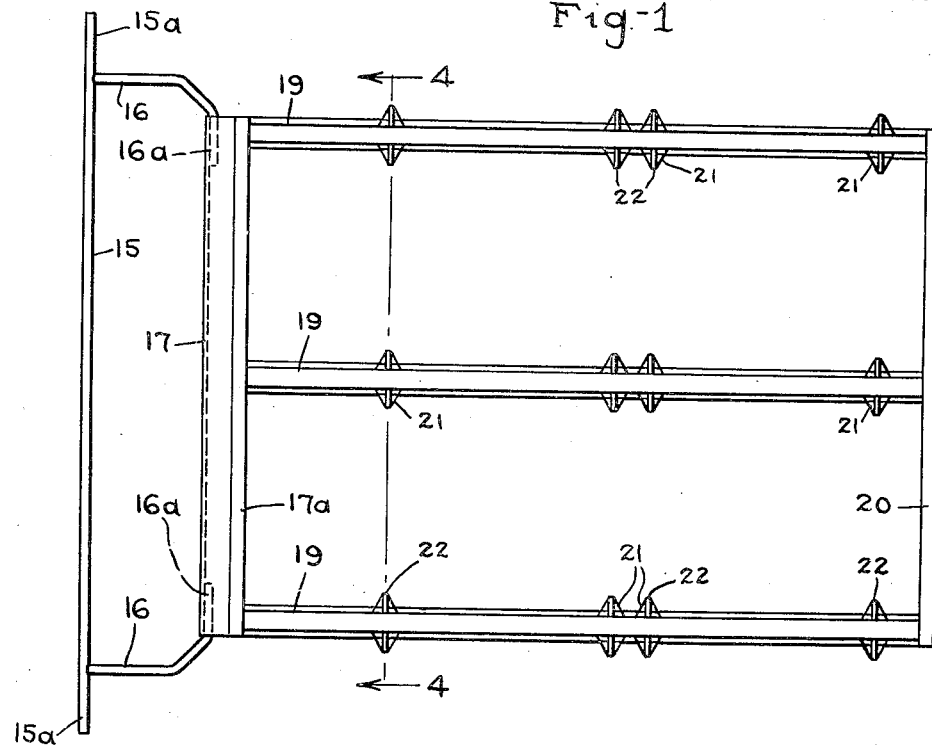
Fig. 1 is a view in side elevation of said hanger.
Figure 2:
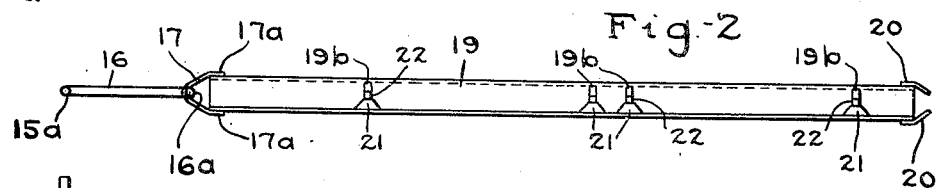
Fig. 2 is a view in end elevation of said hanger.

Referring to the drawings a film hanger is shown comprising a top rod or bar 15. While said bar may be any convenient form, in the embodiment of the invention illustrated it is shown as formed of a round rod. Members or rods 16 depend from rod 15 adjacent the ends thereof, the same being bent at an obtuse angle to extend toward each other and terminating in substantially horizontal portions 16a. Portions 16a extend to some distance within the ends of and are secured to a member 17 illustrated as of channel form having an upper curved portion or top and having depending diverging sides which terminate in substantially vertical parallel portions 17a. Portion 16a will be secured to member 17 in any suitable manner as by welding. A plurality of members 19 are provided wihch extend into member 17 between portions 17a and are disposed at right angles to member 17 and secured thereto in any suitable manner as by welding. While members 19 might be variously formed, in the embodiment of the invention illustrated they are in the form of channels having substantially parallel sides or walls. Members 19 as shown are formed of a plate bent into channel shape with outwardly extending terminal flanges. Each side of the channel is thus in the form of a plate or plate-like portion. Members 20 shown in the form of plates extend in parallel relation along each side of members 19 at the ends thereof opposite member 17, the same being disposed substantially parallel to member 15 and having their lower portions bent to converge toward each other as shown in Fig. 2. Members 19 and 20 will be secured together in any suitable manner as by welding. The projecting portions 15a of member or rod 15 will enable the hanger to be suspended on suitable spaced supports. Each member 19 has outwardly extending short flanges 19a at its open side and has secured thereto in certain spaced relation outwardly projecting members 21. These members 21 have substantially rectangular portions engaging the top of flange 19a and have portions trapezoidal in plan projecting upwardly and outwardly from said flange. Members 21 will be secured to flanges 19a in any suitable manner as by welding. Disposed in each of the members 19 adjacent members 21 are the members 22. Members 22 are formed from a flat sheet of material and have the form shown in Fig. 7. Each member 22 comprises a central portion 22a shown as mostly rectangular in side elevation and projecting side portions or arms 22b. The members 22 have their central portions disposed within the channels 19 with the arms 22b projecting through elongated slots 19b in the sides or walls of channels 19, which slots extend transversely of said channels. Each member 22 is provided with an aperture 22c in which is received the end portion of one arm 23a of a bow spring 23 disposed in channel 19 and having its other arm 23b engaging the top of channel 19. The end portion of arm 23a is provided with a slot or recess 23c fitting over member 22 at the bottom of aperture 22c. The springs 23 are formed as shown in Fig. 10, the arms 23a and 23b thereof being formed on laterally disposed compound curves so as to engage the inner sides of channel 19 and thus be firmly held in position.

Figure 3:
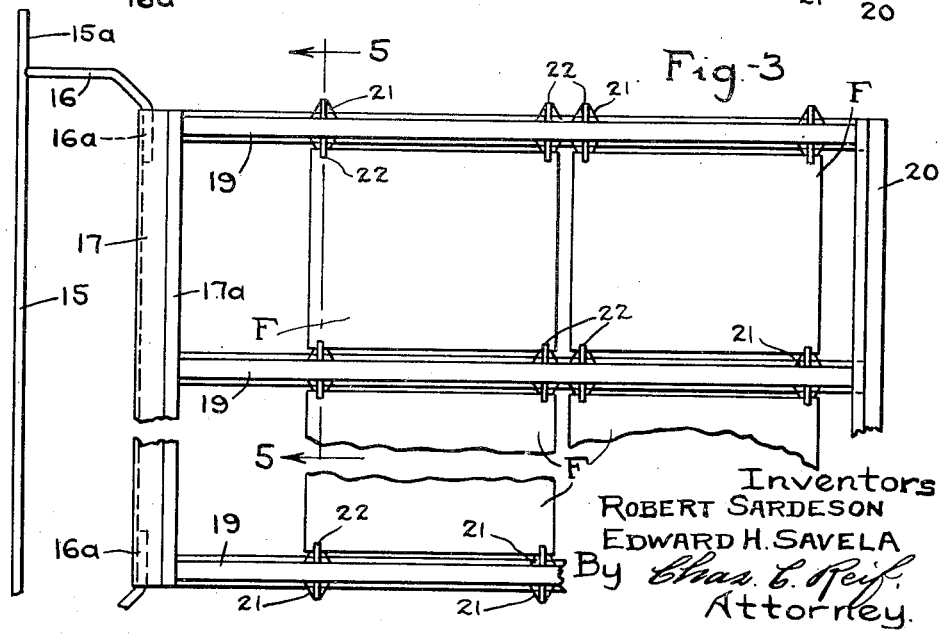
Fig. 3 is a view similar to Fig. 1 showing films held in said hanger, a portion being broken away.

In operation when it is desired to secure films in said holder the hanger is placed on another member or device having portions adapted to engage the bottoms of members 22 with the hanger disposed in horizontal position with portions 22a directed downwardly. With the hanger so disposed and members 22 so engaged the hanger is depressed by pressing downwardly on the top of channels 19. This compresses springs 23 and moves member 21 downwardly. Members 21 and 22 are gripping members and each pair of them form a gripping means. When members 21 are thus moved downwardly away from members 22 the edge portions of the films F can be disposed between members 21 and 22 so that when pressure on the top of channels 19 is relieved, springs 23 will urge members 21 and 22 into gripping relation and the films will be gripped at their edge portions and preferably adjacent the corners thereof as shown in Fig. 3, so that all of said films will be securely and firmly held in said hanger. A plurality of films can be easily and quickly placed in said hanger and all of the gripping means simultaneously operated to position the edge portions of the films between the gripping members of said means in a device disclosed and claimed in applicants' previously filed application S. N. 544,278, filed July 10, 1944 for "Film loading device." When the films are thus secured in the hanger it can be held or carried by holding the rod 15 and transferred to any desired location. Hanger 15 is designed to hold the films while they are moved through certain processing machines.

From the above description it will be seen that we have provided a very simple and efficient film holding device. The films are merely gripped at their edge portion and are not pierced. The device comprises few parts which are simple in form and can be easily made from standard material. The hanger is so constructed that it can be easily and quickly loaded. The films are very securely held adjacent their corners and are maintained in one plane. The device has been amply demonstrated in actual practice and found to be very successful and efficient and is being commercially made.

It will of course, be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. A film hanger comprising a frame having substantially parallel portions, said portions being in the form of channels, each portion having thereon a plurality of spaced gripping means, each of said means comprising a pair of gripping jaws, one of said jaws being rigid with and having parts disposed at the outer sides of said channel and extending transversely of said channel the other gripping jaw being disposed largely in said channel and having parts projecting through the sides of said channel to cooperate with said first mentioned gripping jaw and resilient means urging said other gripping jaw toward said first mentioned jaw and into gripping relation therewith.

2. A film hanger comprising a frame having spaced elongated portions, each of said portions having a plurality of spaced gripping means thereon, said portions being in the form of channels, each of said means comprising a pair of gripping members extending transversely of said channel, one of which is rigid with said channel and the other of which is movable in said channel and resilient means disposed in said channel and engaging said other gripping member to urge it toward said first mentioned gripping member and into gripping relation with said first mentioned gripping member.

3. The structure set forth in claim 2, said resilient means comprising a bow spring having one end engaging said gripping member and its other end engaging the top of said channel, the sides of said spring having convolutions engaging respectively the sides of said channel.

4. The structure set forth in claim 2, said resilient means comprising a bow spring having one end engaging said gripping member in said channel and its other end engaging the top of said channel.

5. The structure set forth in claim 2, said resilient means comprising a spring having a portion engaging said gripping member in said channel, a portion engaging the top of said channel and portions engaging the sides of said channel for holding said spring in position.

6. A film hanger comprising a frame having substantially parallel members, each of said members having a plate-like portion, a plurality of gripping means carried by each of said members, each of said means comprising a pair of gripping jaws, one jaw of which is rigid with said plate-like portion and projects transversely thereof, the other of said jaws being movable toward and from said first mentioned jaw and relatively to said plate-like portion, said portion having a slot through which said other jaw projects and in which it moves, said other jaw being alined with said first mentioned jaw, and resilient means urging said jaws in gripping relation.

7. A film hanger having in combination, a frame comprising substantially parallel members, said members being in the form of channels and each having mounted thereon a plurality of spaced gripping means, each of said gripping means comprising a pair of gripping jaws, one of said jaws being rigidly secured to said channel and projecting laterally therefrom, said channel having a slot in the side thereof, the other of said jaws having a portion movable in said channel and a portion projecting through and movable in said slot and being alined with said first mentioned jaw, and resilient means in said channel for moving said jaws into gripping relation.

8. A film hanger having in combination, a frame comprising substantially parallel members, said members being in the form of channels and each having mounted thereon a plurality of spaced gripping means, each of said gripping means comprising a pair of gripping jaws, one of said jaws being rigidly secured to the sides of said channel and comprising portions projecting at each side of said channel, said channel having transversely alined slots in the sides thereof respectively, the other gripping jaw having a portion movable in said channel and having arms projecting through slots respectively and being disposed in alinement with the portions of said first mentioned jaw respectively, and resilient means in said channel acting on said channel and second mentioned jaw to move said jaws into gripping relation.

9. A film hanger comprising a frame having substantially parallel members, said members being in the form of channels, each of said members having mounted thereon a plurality of spaced gripping means, each of said gripping means comprising relatively movable gripping jaws, said channels having outwardly extending flanges at their open sides, one of said jaws being rigidly secured to said flanges and comprising portions projecting outwardly from said flanges respectively, said channel having slots in its sides respectively and the other of said jaws having a portion disposed within said channel and having arms projecting through slots respectively and being alined with the portions of said first mentioned jaw respectively, and resilient means disposed in said channel for moving said jaws into gripping relation.

10. The structure set forth in claim 9, said resilient means comprising a bow spring having one end engaging said movable jaw and its other end engaging the top of said channel.

11. The structure set forth in claim 9, said resilient means comprising a spring having a portion engaging said movable jaw, a portion engaging the top of said channel and portions engaging the side of said channel for holding said spring in position.

12. A film hanger structure having in combination, an elongated member in the form of a channel, a pair of gripping jaws carried by said channel, one of said jaws being rigidly secured to the side of said channel and projecting transversely therefrom, the other of said gripping jaws having a portion movable in said channel and a portion projecting through the side of said channel, said last mentioned portion being alined with and movable toward and from said first mentioned jaw, and resilient means in said channel for moving said fast mentioned jaw toward said first mentioned jaw.

13. A film hanger structure comprising an elongated member in the form of a channel, gripping jaws mounted on said channel, one of said jaws having portions rigidly secured respectively to the sides of said channel and projecting outwardly therefrom, the other of said jaws having a portion movable in said channel and having portions projecting through the sides of said channel, said last mentioned portions being alined with said first mentioned jaw, and resilient means in said channel acting on said last mentioned jaw to move it toward said first mentioned jaw and into gripping relation therewith.

14. A film hanger having in combination, a member including a plate having a slot therein, a gripping jaw rigid with said plate, projecting at one side thereof and extending across and at each side of said slot, a movable gripping jaw of less width than said slot extending through and guided in said slot to move toward and from said first mentioned jaw and co-operate therewith in gripping a film, and a spring carried by said member adjacent said plate for moving said movable jaw toward said first mentioned jaw.

15. A film hanger having in combination, a member including spaced substantially parallel plate-like portions having transversely alined slots therein, jaws fixed to each of said portions respectively, projecting outwardly at the remote sides of said portions and centrally alined with said slots respectively in a line perpendicular to said portions, a movable jaw having a portion disposed between said portions and having jaws projecting through and guided in said slots respectively to be disposed in alinement with said first mentioned jaws respectively and a spring disposed between said plate-like portions and engaging said movable jaw and engaging said member to move said movable jaw toward said first mentioned jaws.

16. The structure set forth in claim 15, said spring being engaged at the side remote from said movable jaw by said member and said movable jaw having a portion exposed between said plate-like portions whereby said last mentioned portion can be placed against a fixed support and said member moved toward said support to compress said spring and separate said jaws.

17. A film hanger having in combination, a member including a plate having a slot therein, a jaw secured to said plate and rigid therewith and being centrally alined with said slot in a line perpendicular to said plate, said jaw projecting at one side of said plate, a movable jaw having a portion extending through said slot in a direction perpendicular to said plate, guided in said slot and movable toward and from said first mentioned jaw to co-operate therewith to grip a film, and a spring adjacent said plate engaging said movable jaw at one end and said member at its other end, said movable jaw having an exposed portion opposite said spring which may be placed against a fixed support and said member then moved toward said support to compress said spring and separate said jaws.

ROBERT SARDESON.
EDWARD H. SAVELA.

REFERENCES CITED

The following references are of record in the file of this patent:

UNITED STATES PATENTS

| Number | Name | Date |
|---|---|---|
| 650,660 | Schoonmaker | May 29, 1900 |
| 1,496,003 | Holzmueller | June 3, 1924 |
| 1,854,931 | Gollomb | Apr. 19, 1932 |
| 1,955,575 | Buck | Apr. 17, 1934 |
| 2,186,891 | Wilson | Jan. 9, 1940 |
| 2,269,820 | Jones et al. | Jan. 13, 1942 |
| 2,290,831 | Fink | July 21, 1942 |